United States Patent
Kuder et al.

[11] Patent Number: 6,042,902
[45] Date of Patent: Mar. 28, 2000

[54] ADHESIVES FOR MAKING MULTILAYER FILMS COMPRISING LIQUID CRYSTALLINE POLYMERS AND POLY (ETHYLENE TEREPHTHALATE) OR POLYCARBONATE

[75] Inventors: James E. Kuder, Fanwood; Dominick Cangiano, Neshanic; Vincent J. Provino, Clifton; Wayne Xu, Lake-Hiawatha, all of N.J.

[73] Assignee: Hoechst Celanese Corporation, N.J.

[21] Appl. No.: 08/954,997

[22] Filed: Oct. 20, 1997

[51] Int. Cl.⁷ ................................................. C09K 19/00
[52] U.S. Cl. .................. 428/1; 428/412; 428/475.8; 428/476.9; 428/480; 428/520; 156/325; 156/331.8; 156/334
[58] Field of Search ............... 428/1, 412, 480, 428/520, 475.8, 476.9; 156/325, 331.8, 334

[56] References Cited

U.S. PATENT DOCUMENTS

| | | | |
|---|---|---|---|
| 4,473,682 | 9/1984 | Calundann et al. | 524/605 |
| 5,204,443 | 4/1993 | Lee et al. | 528/184 |
| 5,227,456 | 7/1993 | Shepherd | 528/173 |
| 5,405,565 | 4/1995 | Sumida et al. | 264/173.14 |
| 5,512,625 | 4/1996 | Butterbach et al. | 524/490 |
| 5,656,714 | 8/1997 | Shen et al. | 528/193 |
| 5,738,918 | 4/1998 | Shen et al. | 428/1 |
| 5,744,204 | 4/1998 | Jester | 428/1 |
| 5,863,622 | 1/1999 | Jester | 428/1 |

FOREIGN PATENT DOCUMENTS

| | | |
|---|---|---|
| 0 503 063 | 9/1992 | European Pat. Off. . |
| 0 763 423 | 3/1997 | European Pat. Off. . |
| 02253950 | 10/1990 | Japan . |
| 02253951 | 10/1990 | Japan . |
| 2-253920 | 10/1990 | Japan . |
| 2-253950 | 10/1990 | Japan . |
| 2-253951 | 10/1990 | Japan . |
| 2-307751 | 12/1990 | Japan . |
| 4-135750 | 5/1992 | Japan . |
| WO 92/18568 | 10/1992 | WIPO . |
| WO 93/24574 | 12/1993 | WIPO . |
| WO 95/23180 | 8/1995 | WIPO . |
| WO 96/00752 | 1/1996 | WIPO . |
| WO 97/47467 | 12/1997 | WIPO . |

*Primary Examiner*—Leszek Kiliman

[57] ABSTRACT

Multilayer films that include a thermotropic liquid crystalline polymer film layer and a poly(ethylene terephthalate) or polycarbonate film layer are bound together using a hot melt adhesive, which may be either (1) a blend of poly($\alpha$-olefins) that includes isotactic polypropylene, a polymer of a second lower poly($\alpha$-olefin), and a small amount of a higher poly($\alpha$-olefin); or (2) a polyamide-based hot melt adhesive.

22 Claims, No Drawings

ADHESIVES FOR MAKING MULTILAYER FILMS COMPRISING LIQUID CRYSTALLINE POLYMERS AND POLY(ETHYLENE TEREPHTHALATE) OR POLYCARBONATE

RELATED APPLICATIONS

The following four copending applications filed on even date herewith, all contain related subject matter: U.S. application Ser. Nos.: 08/759,327, 08/954,378, 08/954,379, and 08/955,000 all now pending.

FIELD OF THE INVENTION

This invention relates to multilayer films, and more specifically to multilayer films that include a liquid crystalline polymer film and an isotropic polymer film, where the isotropic polymer is polycarbonate or poly(ethylene terephthalate).

BACKGROUND OF THE INVENTION

Liquid crystalline polymer (LCP) films have properties that are very desirable, such as excellent chemical resistance, high strength, and excellent gas barrier properties. However, these same films have certain undesirable properties. They often have poor transverse mechanical properties (i.e. they are strong in the machine direction, but tear easily in the direction transverse to the machine direction). It is also difficult to write or print on the films. LCP films are more expensive than conventional polymer films, such as polyester films.

It would be desirable to make multilayer films having LCP film bonded to one or more other films to obtain a film having the best properties of all of the various layers, such as a multilayer film having good gas barrier properties and relatively low cost.

However, LCP films do not bond well to each other or to other films by use of an adhesive. Their surfaces do not in general adhere to adhesives. There are thus very few examples of multilayer films containing one or more LCP layers. Multilayer films in which LCP's are bound to either poly(ethylene terephthalate) or polycarbonate using an adhesive appear to have been mentioned only rarely or not at all. An example of a multilayer film containing an LCP and another polymer is found in Japanese Patent Application No. 02-253,950, published in 1990, where a poly(butylene terephthalate) film layer is bound to VECTRA® A 900 LCP film using a glycidyl-modified ethylene vinyl acetate adhesive. The other side of the VECTRA film is bound to polypropylene film by using two adhesive layers, a glycidyl-modified ethylene vinyl acetate layer in contact with the LCP and an ethyl acrylate-ethylene-maleic anhydride copolymer in contact with the polypropylene. Japanese Patent publications 02-253,951 (1990) and 04-135,750 (1992) use similar adhesives for binding an LCP to poly (butylene terephthalate) and polypropylene. The latter of these patent applications also uses a saponified ethylene-vinyl acetate copolymer as an adhesive. Other publications that discuss multilayer films comprising an LCP barrier layer include Japanese Patent Publication 02-307,751 (1990), PCT Patent Publication WO 95/23180, and European Patent Application No. 763,423.

SUMMARY OF THE INVENTION

Adhesives have now been identified that bind LCP films having several different compositions to poly(ethylene terephthalate) and to polycarbonate. These adhesives are all hot melt adhesives and are the same for LCP bound to either poly(ethylene terephthalate) or polycarbonate. These are summarized below:

(1) A polyolefin blend, which is a mixture of poly($\alpha$-olefins), comprised mainly of isotactic polypropylene and a polymer of a second lower $\alpha$-olefin, with small amounts of higher poly($\alpha$-olefins).

(2) Polyamide resins of varying structure and molecular weight, including polyamides based on polymers of dimer acid.

Multilayer films are made by heating the two films that are being bonded together to a temperature above the melting points of both polymers and of the hot melt adhesive, under a compressive force, or by co-extruding the molten polymers including adhesives, to form multilayer films.

The adhesives described above also turn out to be compatibilizers for blends of LCP and either polycarbonate or poly(ethylene terephthalate). The blends are made by extruding the LCP, polycarbonate or poly(ethylene terephthalate), and the adhesive/compatibilizer in the molten phase through an extruder under mixing conditions.

The words "films" and "sheets" and "films and sheets" are all used herein to describe thin flexible plastic fabricated structures. These generally have a thickness in the range of about 0.01 mm (0.4 mils) to about 10 mm (400 mils). This range of thicknesses is wide enough to encompass the common meaning of both films (<0.25 mm) and sheets (thicker than films), and the words "films" and "sheets" therefore are used interchangeably to describe something that may be described either as a film or sheet. The layers in coextruded films and sheets will likewise have the same broad range of thicknesses described above (i.e. about 0.01 mm to about 10 mm). The laminated and coextruded structures will be thicker since they are made up of several layers or films. Finally, "multilayer" sheets and films includes both laminated sheets and films and coextruded sheets and films. Laminated sheets and films are made by laminating sheets and films together. Coextruded sheets and films are made by coextruding the polymers through the die of an extruder in such a way that a multilayer film or sheet is formed. Multilayer films are also sometimes referred to as laminates, regardless of how they are made.

DETAILED DESCRIPTION OF THE INVENTION

Liquid crystalline polymers (LCP's) are well known in the art and are characterized as having a liquid crystalline phase above the temperature at which the polymers become molten. The liquid crystalline polymers used in the multilayer films described herein are generally all-aromatic polymers, with relatively linear structures, which exhibit liquid crystalline behavior in the molten phase. They are generally polyesters or poly(ester-amides), and generally comprise monomer units that include within their structures, exclusive of functional groups, one or more of the following aromatic nuclei: 1,4-phenylene, 1,3-phenylene, 4,4'-biphenylene, and 2,6- and/or 2,7-naphthalene. Some LCP's also contain monomer units that are derived from ethylene glycol. Preferred LCP's contain only aromatic monomer units.

Generally, the LCP's comprise monomer units derived from one or more of the following monomers and generally at least two of the following monomers: terephthalic acid, isophthalic acid, 1,4-hydroquinone, resorcinol, 4-aminobenzoic acid, 4-hydroxybenzoic acid, 4-aminophenol, 1,4-phenylenediamine, 4,4'-biphenol, 4,4'-biphenyldicarboxylic acid, 6-hydroxy-2-naphthoic acid, 2,6-naphthalenedicarboxylic acid, and 2,6-dihydroxynaphthalene. Preferred LCP's include the polymers that are sold under the VECTRA® trademark, most of which comprise monomer units derived from 6-hydroxy-2-naphthoic acid (HNA) and 4-hydroxybenzoic acid is (HBA) in their structure. Particularly preferred polymers from the VECTRA products are the VECTRA A polymers, made up of about 73% HBA monomer units and 27% HNA monomer units, and VECTRA E products, which contain HBA, HNA, 4,4'-biphenol (BP) and terephthalic acid (TA) as described in U.S. Pat. No. 4,473,682, incorporated herein by reference. The polyesteramide comprising HBA, HNA, BP, TA and 4-aminophenol, taught in U.S. Pat. No. 5,204,443, which is also incorporated herein by reference, is also useful with these adhesives. All of these products are available from Hoechst Technical Polymers, Summit, N.J. Another LCP which may be made into multilayer films using the adhesives taught herein is disclosed in U.S. Pat. No. 5,656,714, incorporated herein by reference, and comprises monomer units derived from HBA, HNA, BP, TA, and resorcinol. LCP's comprising BP, HBA, TA, and other optional monomers are available from Amoco Chemicals under the XYDAR® trademark. LCP's containing 2,6-naphthalenedicarboxylic acid, BP, and other monomer units are also available from DuPont. All of these polymers can be made into multilayer films and polymer blends using the adhesives and methods taught herein.

The following LCP's were tested herein for the purpose of obtaining multilayer films:

(1) VECTRA® A film, comprised of monomer units derived from HBA and HNA in a ratio of about 73:27, and having a melting temperature of about 280° C.

(2) VECTRA® B Resin, which is a polyesteramide comprising monomer units derived from HNA, TA, and 4-aminophenol (see U.S. Pat. No. 4,330,457) and which has a melting temperature of about 280° C.

(3) VECTRA® L Resin, which is a liquid crystalline poly(esteramide) comprised of monomer units derived from HBA, HNA, BP, TA and 4-aminophenol in accordance with U.S. Pat. No. 5,204,443. This resin has a melting temperature of 302° C.

(4) An experimental LCP polyester, comprising monomer units derived from HBA, HNA, HQ, and TA, referred to hereinafter as Experimental Polymer 1. It has a melting temperature of about 220° C.

(5) An experimental LCP polyester film that has been modified to have better adhesion by including monomer units that have sulfonate groups. It comprises monomer units made from about 73 mole % HBA, about 27 mole % HNA, and the sodium salt of 5-sulfoisophthalic acid (0.2 mole %). It has a melting point of 270° C., and is further described in U.S. Pat. No. 5,227,456 which is incorporated herein by reference. It is referred to hereafter as Experimental Polymer 2.

(6) An experimental liquid crystalline polymer that comprises monomer units derived from HBA, HNA, BP, TA, and resorcinol, as described in U.S. Pat. No. 5,656,714. It is referred to hereafter as Experimental Polymer 3.

Some of the polymers, e.g. VECTRA® A, B, and L resins are available commercially as glass-filled polymer resins or as films. VECTRA® A resin is available as fiber, film, or filled resin.

The polycarbonate and poly(ethylene terephthalate) films to which the LCP films are bound using the adhesives disclosed herein are all commercially available materials. Polycarbonate (the polycarbonate of bisphenol-A) and poly(ethylene terephthate) are both commercially available resins that are widely used in various fabricated products, including films. These polymers can be purchased in film form or purchased as resin and made into film.

The types of adhesives that are useful in this invention are all commercially available and are described in more detail below.

Polyolefin Blend

MACROMELT® Q5353 hot melt adhesive from Henkel Corporation turned out to be an excellent hot-melt adhesive for combining LCP films with polyethylene, polypropylene, polycarbonate, poly(ethylene terephthlate), and poly(phenylene sulfide). The material appears to be a mixture of poly($\alpha$-olefins), consisting mainly of isotactic polypropylene and a polymer of a second $\alpha$-olefin, perhaps atactic poly(1-butene), combined with a small amount of one or more higher poly($\alpha$-olefin) oligomers. The material exhibits a trace of carbonyl absorption under infrared analysis, and traces of aromatic absorptions by $C^{13}$-NMR analysis, but both are at levels of <3 mole %. The material is described in U.S. Pat. No. 5,512,625, which is incorporated herein by reference. The patent indicates that the polyolefin blend comprises an oligomer of an $\alpha$-olefin with at least 8 carbon atoms in the monomer blended with a substantially amorphous poly($\alpha$-olefin) (perhaps atactic poly(1-butene) and a substantially crystalline poly($\alpha$-olefin) (e.g. isotactic polypropylene).

Polyamide Resins

A number of polyamide hot melt adhesives (individually, or together) are suitable for bonding polycarbonate film or poly(ethylene terephthalate film), to LCP films. These include the dimer acid based polyamide described below (MACROMELT® 6239) and other polyamides that are sold as hot melt adhesives (e.g. MACROMELT® 6211 and 6240), all of which generally have softening temperatures in the range of about 130° C. to 160° C. and application temperatures in the range of about 200° C.–270° C., depending on the melting temperatures and viscosities of the polymers being fabricated into multilayer films.

Dimer acid based polyamide adhesives are based on dimer acid, which is a mixture of dimers of $C_8$ unsaturated fatty acids. The 36-carbon dimers are then polymerized with diamines to yield polyamides that are useful as hot melt adhesives. A dimer acid based polyamide that works well in this application is MACROMELT® 6239, supplied by Henkel Corporation. The material has a softening point (Ball and Ring) of 133°–143° C., a melt viscosity of 55–85 poise at 225° C., and an application temperature of 249°–265° C. It is sold as an adhesive for ABS polymers and flexible vinyl polymers.

Methods of Making Laminated Films and Sheets

The films and sheets are most conveniently made on a large scale by a conventional co-extrusion process in which the polymers that make up the various films and adhesive layers are combined within the die head in the molten phase, and extruded through a single slit to form a multilayer film. In coextrusion processes, the adhesives preferably have higher melt viscosities than adhesives used for compression bonding. The viscosities of the components in a coextrusion process should have comparable melt viscosities (within a factor of 10).

On a laboratory scale, samples of multilayer films are made by compression molding, i.e. by heating stacked layers of the films and the adhesive layers, which are also in film form, under pressure to a temperature above the melting point of the LCP and adhesive layers. Films that are to be laminated together generally have a thickness in the range of about 0.01 mm to about 10 mm.

The adhesives identified above are also suitable for use as compatibilizers in making polymer blends. The blends are made by conventional blending methods, most typically by feeding the polymers and adhesives simultaneously into an extruder and mixing them in the melt phase in the extruder. Twin screw extruders are generally preferred for making blends.

The practice of the invention is shown by the following examples, which are illustrative only and should not be viewed as limiting the scope of the invention.

EXAMPLES

Example 1

Synthesis of LCPs

The LCPs used in evaluating multilayer films were either commercially available or were made by methods similar to the method shown below for making a copolymer of about 73 mole % 4-hydroxybenzoic acid (HBA), 27% of 6-hydroxy-2-naphthoic acid (HNA), and 0.2% of 5-sulfoisophthalic acid (SSI).

A pilot scale reactor was charged with 150.4 lbs (493.8 moles) of HBA, 75.8 lbs (182.7 moles) of HNA, and 0.8 lbs (1.35 moles) of SSI. Following vacuum deaeration, acetic anhydride (154.3 lbs, 1.0 mole % excess) was charged into the reactor and the water in the cold finger condenser was turned on as an aid to control reflux. The mixture was then stirred at 45 rpm and heated according to the following temperature profile:

| Stage | 1 | 2 | 3 | 4 | 5 | 6 | 7 | 8 | 9 | 10 | 11 | 12 |
|---|---|---|---|---|---|---|---|---|---|---|---|---|
| Final Temp (° C.) | 25 | 125 | 130 | 140 | 150 | 200 | 210 | 220 | 335 | 340 | 340 | 340 |
| Time (min.) | 1 | 50 | 10 | 40 | 20 | 45 | 5 | 7 | 115 | 10 | 10 | 360 |

After 7 to 8 hours the final temperature of 340° C. was reached. The water in the cold finger was turned off when the reaction temperature reached 300° C. After holding at 340° C. for 30 minutes, the vacuum stripping cycle was started during stage 12, and the stirring rate was reduced to 25 rpm. Full vacuum (7 mm Hg) was typically reached in 45 minutes. The mixture was heated at 340° C. under full vacuum for an additional period of time to obtain the targeted stirring torque (base torque +700 in-lbs). After reaching the target torque the vacuum was broken by allowing nitrogen back into the reactor. The polymer was held at 340° C. while it was extruded from the reactor through a 5 hole die with nitrogen pressure over 35–45 minutes. The polymer strands were cooled in a water trough and then sent through a chopper, and the reactor chip was collected in a drum. Samples for polymer evaluation were collected at the beginning, middle, and end of the extrusion. The polymer was tumble dried, sieved, and weighed. The typical yield was 154 pounds (77%).

Example 2

Sample Preparation and Testing

LCP films were prepared by extruding the LCP in the molten phase through a die with a vacuum applied at the venting port to remove volatiles. The extrusion line was a conventional pilot scale extrusion line, producing 2-mil thick LCP films. Poly(ethylene terephthalate) or polycarbonate and the adhesives were separated and made into films with dimensions of 16.5 cm×21.5 cm×1–1.5 mm thick by compression molding on a Wabash Compressor at a temperature of about 20° C. above the melting point of the polymer.

For screening purposes, structures having two layers, either of LCP and adhesive or thermoplastic polymer and adhesive, are first made by heating the LCP or thermoplastic film on fluoropolymer coated aluminum foil in an oven to a temperature about 20° C. above the melting temperature. After the polymer softens, the adhesive layer is placed on top, and then covered with a fluoropolymer coated aluminum release sheet and a 2-pound steel weight. The pressure of the weight is maintained for about 5 minutes, and then the heat and pressure are removed. The adhesive bonding of the thermoplastic or LCP to the adhesive is measured qualitatively as follows. The free ends of the two film layers in the test piece are grasped by hand and pulled apart. The force needed to pull them apart is rated qualitatively on a scale of "1" to "4", where "1" means that adhesion is poor, with no force being required to separate the layers, and "4" means excellent adhesion (the strips cannot be separated by hand). If the LCP and thermoplastic polymers bond well to the same adhesives, (i.e. are rated "3" or "4" using the same adhesive), then they are expected to also attach to each other using the same adhesives to form a multilayer film. The results of the tests are presented in Table 1.

Three layer films were made in some of the cases where it was predicted that good quality three-layer films can be made, based on the screening tests described above. Since good three-layer films were obtained in agreement with the predictions resulting from the screening tests, only a portion of the three layer films that were expected to have good adhesion were actually made. Three layer films are made by the following method.

A test strip of the LCP (about 2.54 cm×15.24 cm×2 mil) is placed on a fluoropolymer coated aluminum release sheet in an oven at a temperature approximately 30° C. above the softening point of the LCP. When visual inspection indicates that the polymer has softened (typically 2–3 minutes), a 2.54 cm test strip of the candidate adhesive is placed on top of the softened polymer. An aluminum release sheet is placed on top of the adhesive and a 2 lb steel weight is set on top of the release sheet. After approximately 5 minutes the material is removed from the oven and allowed to cool to room temperature and the aluminum release sheet is removed. The thermoplastic layer is then applied by placing the LCP/adhesive structure within a 12.7 cm steel frame on top of an aluminum release sheet lying on the platen of a hot press machine set approximately 20° C. above the melting temperature of the thermoplastic material. A 2.54 cm strip of thermoplastic polymer film is placed on top of the adhesive, and fluoropolymer coated aluminum release sheet is placed on top of the material. Two tons of pressure is applied for 10 minutes and then the pressure is released. The material is removed from the platen and allowed to cool to room temperature.

Quantitative measurements of the strengths of the bonds between the LCP and thermoplastic layers are carried out using a modified Simple Lap Joint Test, as set forth in ASTM test method D 1002-94. The test is really designed for bonded metal specimens, but is suitable for comparative testing of bonded polymer films. Samples of 4 mm thick multilayer films are prepared with ½" of overlap for testing. The films are pulled apart using an Instron tensile tester with an angle of peel of 0°. These samples exhibit levels of adhesion between the layers that are comparable to the adhesion between layers in commercial samples of multilayer films (high density polyethylene and ethylene vinyl alchohol) that are used in automobile fuel tanks.

Example 3
Coextrusion of a Multilayer Film

Multilayer films are coextruded using a pilot line designed for making multilayer fims. The pilot line has three extruders with screw diameter of 3.5, 2.0 and 1.5 inches. The polymeric material having the greatest total thickness in the coextruded film is generally extruded with the extruder having the largest screw diameter. The molten polymer streams are delivered to the feed block in channels in which the streams are divided and then combined again so that they emerge from the die lips as a multilayer film, which then impinges on a chill roll and is finally taken up on a roll winder. During the extrusion the overall thickness of the extruded film is continuously monitored by a beta gauge. By means of this equipment, several multilayer films are produced, having the following 5-layer structure:

Polycarbonate or poly(ethylene terephthalate) (PET) 3 mils
Adhesive, 1 mil
LCP, 2 mils
Adhesive 1 mil
Polycarbonate or PET, 3 mils The LCP is Experimental Polymer 3, which is a copolymer of 4-hydroxybenzoic acid, 6-hydroxy-2-napthoic acid, terepthalic acid, 4,4'-biphenol, and resorcinol, as described in U.S. Pat. No. 5,656,714. The polycarbonate and PET are commercially available materials having a molecular weight suitable for making films. The adhesive is MACROMELT Q5353.

Example 4
Adhesion of Polyolefin Blend to Polycarbonate and Poly (ethylene terephthalate) (PET)

MACROMELT® Q5353 polyolefin blend showed good adhesion to all of the conventional polymers that were tested (HDPE, polypropylene, polycarbonate, poly(phenylene sulfide), and PET), achieving a score of 4 with all of the polymer films using the qualitative test method for adhesion. It also adhered well to all of the LCP's that were tested, except VECTRA® B resin, where it still had acceptable adhesion (score of 3) (see Table 1). It is thus the one adhesive tested that was good for making multilayer films of polycarbonate, PET, polyethylene, polypropylene, poly (phenylene sulfide) and LCP's in any order or combination. It is truly surprising that this material could be a "universal adhesive" for multilayer films of conventional polymers and LCP's.

Example 5
Adhesion of Polyamide Adhesives to LCP, Polycarbonate, and PET

Several polyamide-based hot melt adhesives adhere well to LCP's, polycarbonate and PET, and are thus expected to be useful for making multilayer films. MACROMELT® 6239, 6211, and 6240 all adhere well to polycarbonate and PET film (score of 4 using the qualitative test) and adhere well or acceptably well to all of the LCP's that were tested (see Table 1). These are therefore expected to bind polycarbonate or PET to LCP's to make multilayer films.

Compatibilization Tests

The adhesives for making multilayer films also act as compatibilizers for making blends of the same polymers that the adhesives bind together. PET or polycarbonate can be blended with LCP's similarly to the way polypropylene is blended with LCP's, as follows.

As an example, a blend of a fiber grade polypropylene (Montell type KY 6100) with Experimental Polymer 1 was made and evaluated as follows. The blends contained 10% by weight LCP and 90% by weight polypropylene. In addition, an antioxidant (NAUGUARD™ 10 from Ciba-Geigy) and an additive which is a compatibilizer for some combinations of polymers but is not an effective compatibilizer for polypropylene and LCP's (NUCREL™ 0903 ethylene-methacrylic acid copolymer from DuPont) were included at levels of 0.2% and 0.5% by weight respectively for all the samples that were tested. The combinations were compounded with compatibilizers disclosed herein by a single or double pass through an extruder. The compounds were cast into film. The films that included these compatibilizers had a better, more uniform appearance than the films that did not include the compatibilizers.

The compounds were also made into films by extrusion, and the tensile properties were measured by ASTM method D1876. The results for the control (without the compatibilizer) and the two samples with the compatibilizer follow:

(1) No compatibilizer—tensile modulus, 1.44 GPa; yield stress, 22.5 MPa;

(2) 1% by weight of a 50:50 blend of POLYBOND® 3002 and MACROMELT® 6239—tensile modulus, 1.69 GPa; yield stress, 29.5 MPa;

(3) 1% by weight of a 40:60 blend of POLYBOND® 3002 and MACROMELT® 6239—tensile modulus, 1.85 GPa; yield stress, 29.9 MPa.

LCP's and either polycarbonate or PET in the adhesives taught herein behave similarly to the example above. Thus, the blends that include the compatibilizers taught herein have improved appearance and improved tensile properties compared with blends without the compatibilizers.

It is to be understood that the above-described embodiments of the invention are illustrative only and that modification throughout may occur to one skilled in the art. Accordingly this invention is not to be regarded as limited to the embodiments disclosed herein.

TABLE 1

BOND STRENGTH[1] BETWEEN LCP'S, POLYCARBONATE, POLY(ETHYLENE TEREPHTHALATE), AND ADHESIVES

| LCP | MACRO-MELT® Q5353 | MACRO-MELT® 6239 | MACRO-MELT® 6211 | MACRO-MELT® 6240 |
|---|---|---|---|---|
| VECTRA ® A | 4 | 4 | 4 | 4 |
| VECTRA ® B | 3 | 3 | 3 | 3 |
| VECTRA ® L | 4 | 4 | 4 | 3 |
| EXPERIMENTAL POLYMER 1 | 4 | 4 | 4 | 4 |
| EXPERIMENTAL POLYMER 2 | 4 | 4 | 4 | 4 |
| EXPERIMENTAL POLYMER 3 | 4 | 4 | —[2] | —[2] |

TABLE 1-continued

BOND STRENGTH[1] BETWEEN LCP'S, POLYCARBONATE, POLY(ETHYLENE TEREPHTHALATE), AND ADHESIVES

| LCP | MACRO-MELT® Q5353 | MACRO-MELT® 6239 | MACRO-MELT® 6211 | MACRO-MELT® 6240 |
|---|---|---|---|---|
| POLY(ETHYLENE TEREPHTHALATE) | 4 | 4 | —[2] | —[2] |
| POLYCARBONATE | 4 | 4 | 4 | 4 |

[1]Scale of 1–4; 4 is good, 3 is acceptable, and 1 and 2 are not acceptable
[2]Not tested.

We claim:

1. A multilayer film, comprising a layer comprised of polycarbonate or poly(ethylene terephthalate), a thermotropic liquid crystalline polymer layer, and a hot melt adhesive layer between said layers, wherein said hot melt adhesive is selected from the group consisting of (1) a polyolefin blend comprising isotactic polypropylene, a substantially amorphous second poly(α-olefin), and an oligomer of a third α-olefin, which has at least 8 carbon atoms in the α-olefin monomer; and (2) a polyamide having an application temperature of about 200° to about 270° C. and a softening temperature in the range of about 130° to about 160° C., and wherein said thermotropic liquid crystalline polymer layer consists essentially of a thermotropic liquid crystalline polymer.

2. The multilayer film as recited in claim 1, wherein said hot melt adhesive is a polyamide having an application temperature of about 200° to about 270° C. and a softening temperature in the range of about 130° to about 160° C.

3. The multilayer film as recited in claim 1, wherein said hot melt adhesive is a polyolefin blend comprising isotactic polypropylene, a substantially amorphous second poly(α-olefin), and an oligomer of a third α-olefin which has at least 8 carbon atoms in the α-olefin monomer.

4. The multilayer film as recited in claim 1, wherein said hot melt adhesive is a dimer acid based polyamide having a softening temperature in the range of about 133° C. to about 143° C., and a melt viscosity of about 55 poise to about 85 poise, measured at 225° C.

5. The multilayer film as recited in claim 1, wherein said thermotropic liquid crystalline polymer film comprises a polymer derived from one or more monomers selected from the group consisting of terephthalic acid, isophthalic acid, 1,4-hydroquinone, resorcinol, 4-aminobenzoic acid, 4-hydroxybenzoic acid, 4-aminophenol, 1,4-phenylenediamine, 4,4'-biphenol, 4,4'-biphenyldicarboxylic acid, 6-hydroxy-2-naphthoic acid, 2,6-naphthalenedicarboxylic acid, and 2,6-dihydroxynaphthalene.

6. The multilyar film as recited in claim 1, wherein said thermotropic liquid crystalline polymer film is made from a thermotropic liquid crystalline polymer selected from the group consisting of (1) a polymer that consists essentially of monomer units derived from 4-hydroxybenzoic acid and 6-hydroxy-2-naphthoic acid; (2) a polymer that consists essentially of monomer units derived from 6-hydroxy-2-naphthoic acid, terephthalic acid, and 4-aminophenol; (3) a polymer that consists essentially of monomer units derived from 4-hydroxybenzoic acid, 6-hydroxy-2-napthoic acid, 4,4'-biphenol, terephthalic acid, and 4-aminophenol; (4) a polymer that consists essentially of monomer units derived from 4-hydroxybenzoic acid, 6-hydroxy-2-naphthoic acid, hydroquinone, and terephthalic acid; (5) a polymer that consists essentially of monomer units derived from 4-hydroxybenzoic acid, 6-hydroxy-2-naphthoic acid, and 5-sulfoisophthalic acid; (6) a polymer that consists essentially of monomer units derived from 4-hydroxybenzoic acid, 6-hydroxy-2-naphthoic acid, 4,4'-biphenol, terephthalic acid, and resorcinol; and (7) a polymer that consists essentially of monomer units derived from 4-hydroxybenzoic acid, 6-hydroxy-2-naphthoic acid, terephthalic acid, and 4,4'-biphenol.

7. A multilayer film as recited in claim 1, wherein said thermotropic liquid crystalline polymer layer, said layer comprised of polycarbonate or poly(ethylene terephthalate), and said hot melt adhesive layer each have a thickness in the range of about 0.01 mm to about 10 mm.

8. A method of laminating a thermotropic liquid crystalline polymer film and a film comprised of polycarbonate or poly(ethylene terephthalate) together, wherein said thermotropic liquid crystalline polymer film and said film comprised of polycarbonate or poly(ethylene terephthalate) are heated under a compressive force with a hot melt adhesive between said thermotropic liquid crystalline polymer film and said film comprised of polycarbonate or poly(ethylene terephthalate) to a temperature above the melting points of said thermotropic liquid crystalline polymer film, said film comprised of polycarbonate or poly(ethylene terephthalate), and said hot melt adhesive for a time sufficient to melt said hot melt adhesive and bind said film comprised of polycarbonate or poly(ethylene terephthalate) and said thermotropic liquid crystalline polymer film to one another to yield a laminated film, wherein said hot melt adhesive is selected from the group consisting of (a) a polyolefin blend comprising isotactic polypropylene, a substantially amorphous second poly(α-olefin), and an oligomer of a third α-olefin, which has at least 8 carbon atoms in the α-olefin monomer; and (2) a polyamide having an application temperature of about 200° to about 270° C. and a softening temperature in the range of about 130° to about 160° C.

9. The method as recited in claim 8, wherein said hot melt adhesive is in the form of a film.

10. The method as recited in claim 8, wherein said thermotropic liquid crystalline polymer film and said film comprised of polycarbonate or poly(ethylene terephthalate) each have a thickness in the range of about 0.01 mm to about 10 mm.

11. The method as recited in claim 8, wherein said hot melt adhesive is a polyamide having an application temperature of about 200° to about 270° C. and a softening temperature in the range of about 130° to about 160° C.

12. The method as recited in claim 8 wherein said hot melt adhesive is a polyolefin blend comprising isotactic polypropylene, a substantially amorphous second poly(α-olefin), and an oligomer of a third α-olefin which has at least 8 carbon atoms in the (α-olefin monomer.

13. The method as recited in claim 8, wherein said hot melt adhesive is a dimer acid based polyamide having a softening temperature in the range of about 133° C. to about 143° C., and a melt viscosity of about 55 poise to about 85 poise, measured at 225° C.

14. The method as recited in claim 8, wherein said thermotropic liquid crystalline polymer film comprises a polymer derived from one or more monomers selected from the group consisting of terephthalic acid, isophthalic acid, 1,4-hydroquinone, resorcinol, 4-aminobenzoic acid, 4-hydroxybenzoic acid, 4-aminophenol, 1,4-phenylenediamine, 4,4'-biphenol, 4,4'-biphenyldicarboxylic acid, 6-hydroxy-2-naphthoic acid, 2,6-naphthalenedicarboxylic acid, and 2,6-dihydroxynaphthalene.

15. The method as recited in claim 8, wherein said thermotropic liquid crystalline polymer film is made from a thermotropic liquid crystalline polymer selected from the group consisting of (1) a polymer that consists essentially of monomer units derived from 4-hydroxybenzoic acid and 6-hydroxy-2-naphthoic acid; (2) a polymer that consists essentially of monomer units derived from 6-hydroxy-2-naphthoic acid, terephthalic acid, and 4-aminophenol; (3) a polymer that consists essentially of monomer units derived from 4-hydroxybenzoic acid, 6-hydroxy-2-napthoic acid, 4,4'-biphenol, terephthalic acid, and 4-aminophenol; (4) a polymer that consists essentially of monomer units derived from 4-hydroxybenzoic acid, 6-hydroxy-2-naphthoic acid, hydroquinone, and terephthalic acid; (5) a polymer that consists essentially of monomer units derived from 4-hydroxybenzoic acid, 6-hydroxy-2-naphthoic acid, and 5-sulfoisophthalic acid; (6) a polymer that consists essentially of monomer units derived from 4-hydroxybenzoic acid, 6-hydroxy-2-naphthoic acid, 4,4'-biphenol, terephthalic acid, and resorcinol; and (7) a polymer that consists essentially of monomer units derived from 4-hydroxybenzoic acid, 6-hydroxy-2-naphthoic acid, terephthalic acid, and 4,4'-biphenol.

16. A method of making a multilayer film that comprises a layer comprised of polycarbonate or poly(ethylene terephthalate) and a thermotropic liquid crystalline polymer layer consisting essentially of a thermotropic liquid crystalline polymer bound to one another, wherein said thermotropic liquid crystalline polymer, said polycarbonate or poly (ethylene terephthalate), and a hot melt adhesive are combined in the molten state in a die head and extruded through a single slit to yield a multilayer film, wherein said hot melt adhesive is selected from the group consisting of (a) a polyolefin blend comprising isotactic polypropylene, a substantially amorphous second poly(α-olefin), and an oligomer of a third α-olefin, which has at least 8 carbon atoms in the α-olefin monomer; and (2) a polyamide having an application temperature of about 200° to about 270° C. and a softening temperature in the range of about 130° to about 160° C. and wherein such thermotropic liquid crystalline polymer film consists essentially of a thermotropic liquid crystalline polymer.

17. The method as recited in claim 16 wherein said hot melt adhesive is a polyolefin blend comprising isotactic polypropylene, a substantially amorphous second poly(α-olefin), and an oligomer of a third (α-olefin which has at least 8 carbon atoms in the α-olefin monomer.

18. The method as recited in claim 16, wherein said hot melt adhesive is a polyamide having an application temperature of about 200° to about 270° C. and a softening temperature in the range of about 130° to about 160° C.

19. The method as recited in claim 16, wherein said thermotropic liquid crystalline polymer film comprises a polymer derived from one or more monomers selected from the group consisting of terephthalic acid, isophthalic acid, 1,4-hydroquinone, resorcinol, 4-aminobenzoic acid, 4-hydroxybenzoic acid, 4-aminophenol, 1,4-phenylenediamine, 4,4'-biphenol, 4,4'-biphenyldicarboxylic acid, 6-hydroxy-2-naphthoic acid, 2,6-naphthalenedicarboxylic acid, and 2,6-dihydroxynaphthalene.

20. The method as recited in claim 16, wherein said thermotropic liquid crystalline polymer film is made from a thermotropic liquid crystalline polymer selected from the group consisting of (1) a polymer that consists essentially of monomer units derived from 4-hydroxybenzoic acid and 6-hydroxy-2-naphthoic acid; (2) a polymer that consists essentially of monomer units derived from 6-hydroxy-2-naphthoic acid, terephthalic acid, and 4-aminophenol; (3) a polymer that consists essentially of monomer units derived from 4-hydroxybenzoic acid, 6-hydroxy-2-napthoic acid, 4,4'-biphenol, terephthalic acid, and 4-aminophenol; (4) a polymer that consists essentially of monomer units derived from 4-hydroxybenzoic acid, 6-hydroxy-2-naphthoic acid, hydroquinone, and terephthalic acid; (5) a polymer that consists essentially of monomer units derived from 4-hydroxybenzoic acid, 6-hydroxy-2-naphthoic acid, and 5-sulfoisophthalic acid; (6) a polymer that consists essentially of monomer units derived from 4-hydroxybenzoic acid, 6-hydroxy- 2-naphthoic acid, 4,4'-biphenol, terephthalic acid, and resorcinol; and (7) a polymer that consists essentially of monomer units derived from 4-hydroxybenzoic acid, 6-hydroxy-2-naphthoic acid, terephthalic acid, and 4,4'-biphenol.

21. A multilayer film, comprising a layer consisting essentially of polycarbonate, a thermotropic liquid crystalline polymer layer consisting essentially of a thermotropic liquid crystalline polymer, and a hot melt adhesive layer between said layers, wherein said hot melt adhesive is selected from the group consisting of (1) a polyolefin blend comprising isotactic polypropylene, a substantially amorphous second poly(α-olefin), and an oligomer of a third α-olefin, which has at least 8 carbon atoms in the α-olefin monomer, and (2) a polyamide having an application temperature of about 200° to about 270° C. and a softening temperature in the range of about 130° to about 160° C.

22. The method as recited in claim 16, wherein said hot melt adhesive is a dimer acid based polyamide having a softening temperature in the range of about 133° C. to about 143° C., and a melt viscosity of about 55 poise to about 85 poise, measured at 225° C.

* * * * *